(No Model.)
J. H. SCHENKEL & R. B. MAGRUDER.
LAMP ATTACHMENT.
No. 397,569. Patented Feb. 12, 1889.
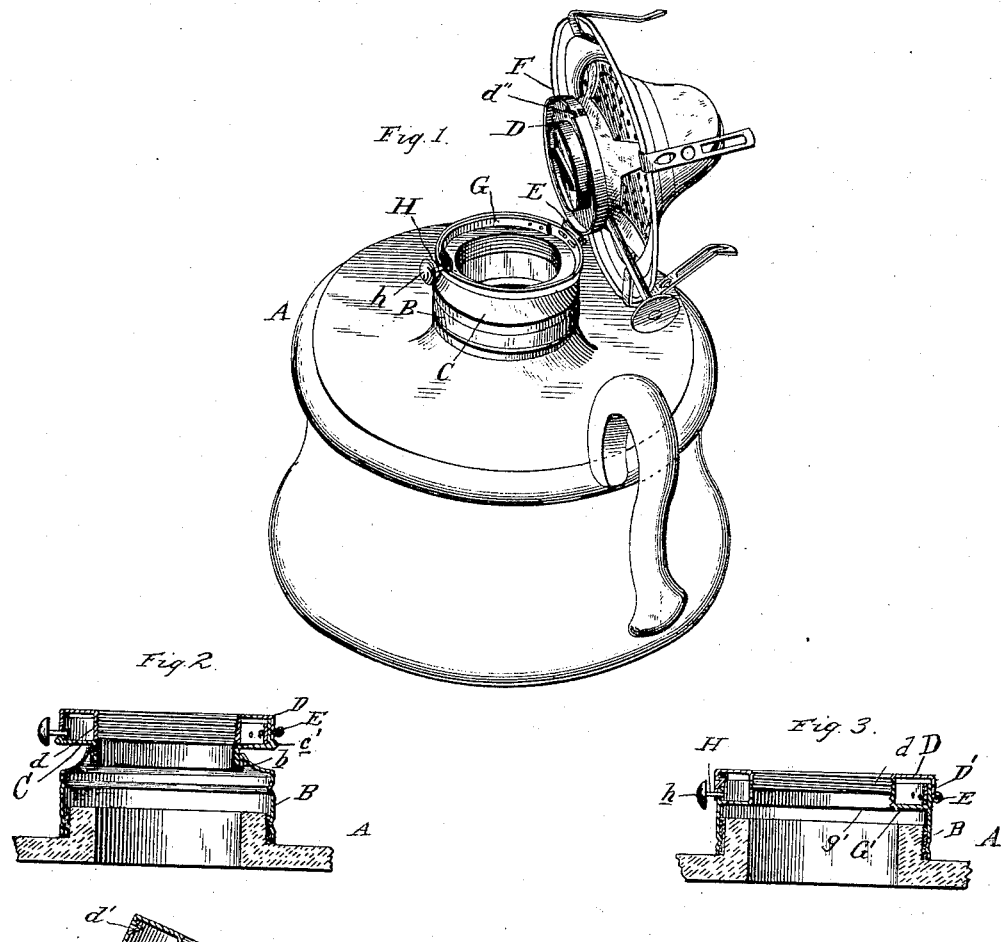
WITNESSES
C. H. Raeder
E. H. Bond.
John H. Schenkel
Richard B. Magruder
INVENTORS,
BY T. J. W. Robertson,
ATTORNEY.

UNITED STATES PATENT OFFICE.

JOHN H. SCHENKEL AND RICHARD B. MAGRUDER, OF BALTIMORE, MARYLAND, ASSIGNORS, BY DIRECT AND MESNE ASSIGNMENTS, TO FRANCIS COPE ADLER, OF PHILADELPHIA, PENNSYLVANIA.

LAMP ATTACHMENT.

SPECIFICATION forming part of Letters Patent No. 397,569, dated February 12, 1889.

Application filed November 25, 1887. Serial No. 256,100. (No model.)

*To all whom it may concern:*

Be it known that we, JOHN H. SCHENKEL and RICHARD B. MAGRUDER, both citizens of the United States, residing at Baltimore, State of Maryland, have invented certain new and useful Improvements in Lamp Attachments, of which the following is a specification, reference being had therein to the accompanying drawings, in which—

Figure 1 represents a perspective view of a lamp with our improvement as adapted to be screwed into an ordinary lamp-collar; Fig. 2, a vertical section of the same detached, on a larger scale. Fig. 3 shows our improvement forming part of the collar of the lamp, and Figs. 4 and 5 show details of the fastening on a larger scale.

This improvement relates to lamps having the burner adapted to swing open, so as to allow of the fount being readily filled; and the invention consists in the peculiar construction, arrangement, and combination of parts hereinafter more particularly described, and then definitely pointed out in the claim.

Referring now to the details of construction, A represents a lamp-fount, on which is secured the ordinary collar, B, in the usual way, which collar has a short tube, $b$, having a female thread, which usually receives the male screw of the burner. This collar we shall here call a "fount-collar," to distinguish it from other collars hereinafter referred to. In our improvement, however, as shown in Figs. 1 and 2, it receives a screw formed on a second collar, C, having a short tube, $c'$, surrounding it, to which is connected another or swinging collar, D, by the hinge E. This upper collar is provided with a depending inner short tube, $d$, provided with a female thread to receive the male thread of the burner F, and has its bottom edge tapering and fitting tightly down within the opening $c$ of the collar and an outer depending short tube, D′, surrounding the tube $c'$.

Attached to the tube $c'$ of the collar C is a spring-catch, G, having one end fastened in any convenient manner to said collar, and its other end enlarged and extending upward above the collar and provided with a hole, $g$, for a purpose explained below. A push-pin, H, preferably having a knob, $h$, is fastened to its free end.

The collar D has a small wedge-shaped catch, $d'$, on its inside, as shown, which pin catches into the hole $g$ in the spring-catch. We prefer to make this catch by forcing inward a little of the metal of the collar, as shown, but do not limit ourselves to this, as any other way of forming a wedge-shaped catch may be adopted. The lower outer edge of the collar D has a small notch, $d''$, the sides of which embrace the pin H. This form of fastening has the advantage of aiding to hold the collars in their proper relative position under the strain caused by screwing on the burner, as the catch $d'$ catches in the hole in the spring-catch, and the pin H is embraced by the sides of the notch $d''$, both of which act to prevent the swinging collar from turning on a vertical axis.

In the form of our invention shown in Fig. 3 we propose to dispense with the separate collar between the burner and the fount-collar and hinge the swinging collar directly to the fount-collar, which we prefer, however, to make a different shape from that usually employed, the upper part (usually containing the female screw) being left off, and a swinging collar, D, hinged thereto instead, into which the burner F screws. In this form of our improvement we secure in the collar, by soldering or otherwise, a flange, G′, having a short tube, $g'$, the upper part of which is very slightly flaring to receive the tube $d'$, which tightly fits within the tube $g'$.

The main feature of our improvement is the short tube $d$, which fits into the opening in a collar beneath it, whether said tube fits into a plain opening, as in Fig. 1, or into an opening provided with an upwardly-rising tube, as in Fig. 3, and we so proportion the parts that the male screw of the burner shall pass far enough into the opening to also act as a seat to cover the joint between the two collars, which will form an additional protection. This prevents oil that may accidentally be splashed upward from passing outside between the joints of the collars, and is a valuable improvement on that form of lamp shown in the Patent No. 363,658, issued to R. B. Magruder, one of the inventors hereof.

The wedge-shaped catch has the advantages of readily allowing the spring-catch to slip over it in closing the collar, of firmly holding it against accidental displacement, and of being very durable and therefore not likely to get out of order.

It will be seen that by our construction we form an annular space around the junction of the two collars, which forms an additional feature of safety in preventing the splashing or leaking of oil between the collars.

What we claim as new is—

The combination, in a lamp, of a collar, D, having the depending inner and outer short tubes, $d$ and D', with a collar, C, having its aperture substantially in line with the inner wall of the tube $d$, and a vertical tube engaging with and hinged to the tube D', whereby an annular space is formed around the inner junction of the collars C and D, substantially as described.

In testimony whereof we affix our signatures, in presence of two witnesses, this 12th day of November, 1887.

JOHN H. SCHENKEL.
RICHARD B. MAGRUDER.

Witnesses:
WM. H. H. RALEIGH,
HENRY C. THOMAS.